United States Patent Office 2,992,517
Patented July 18, 1961

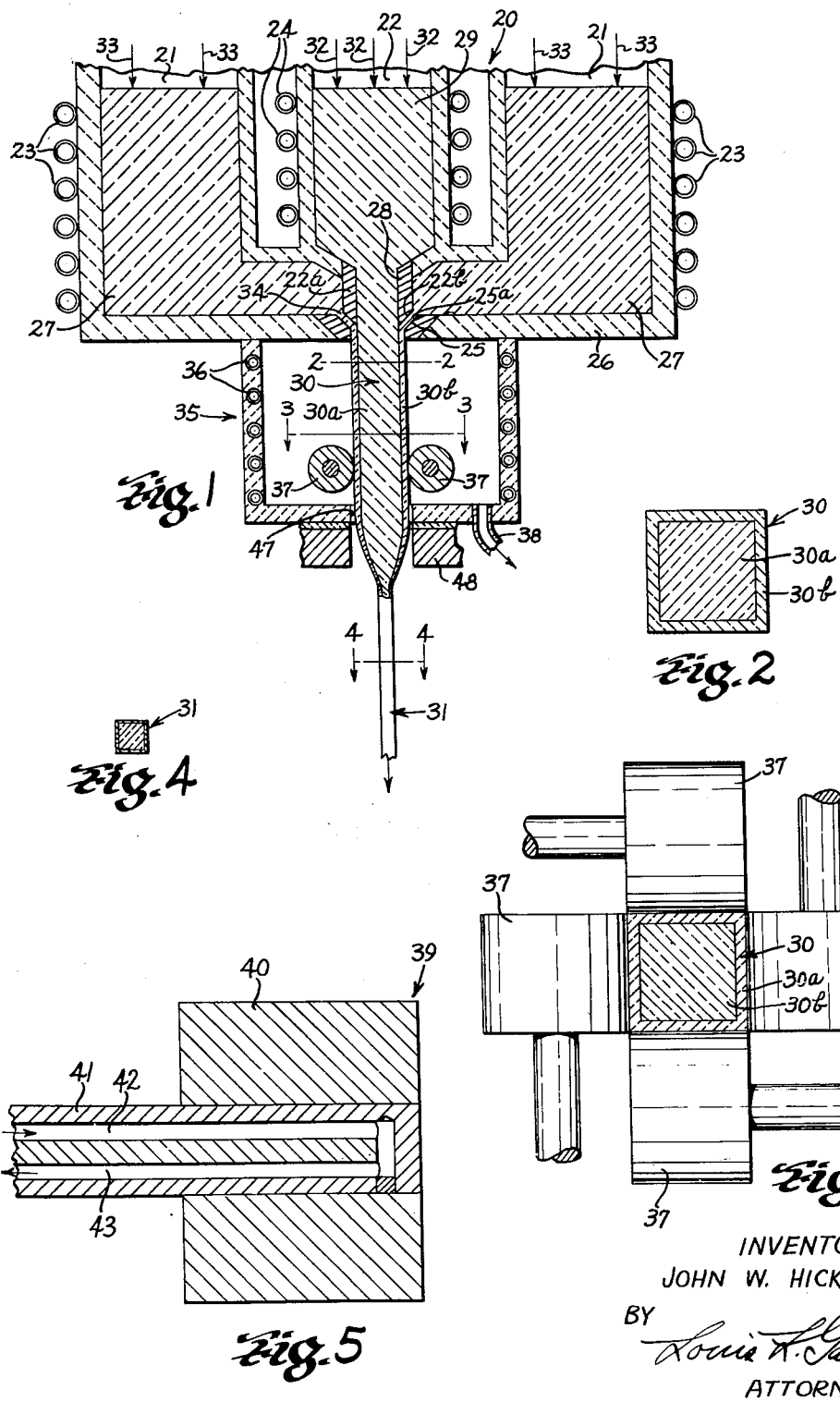

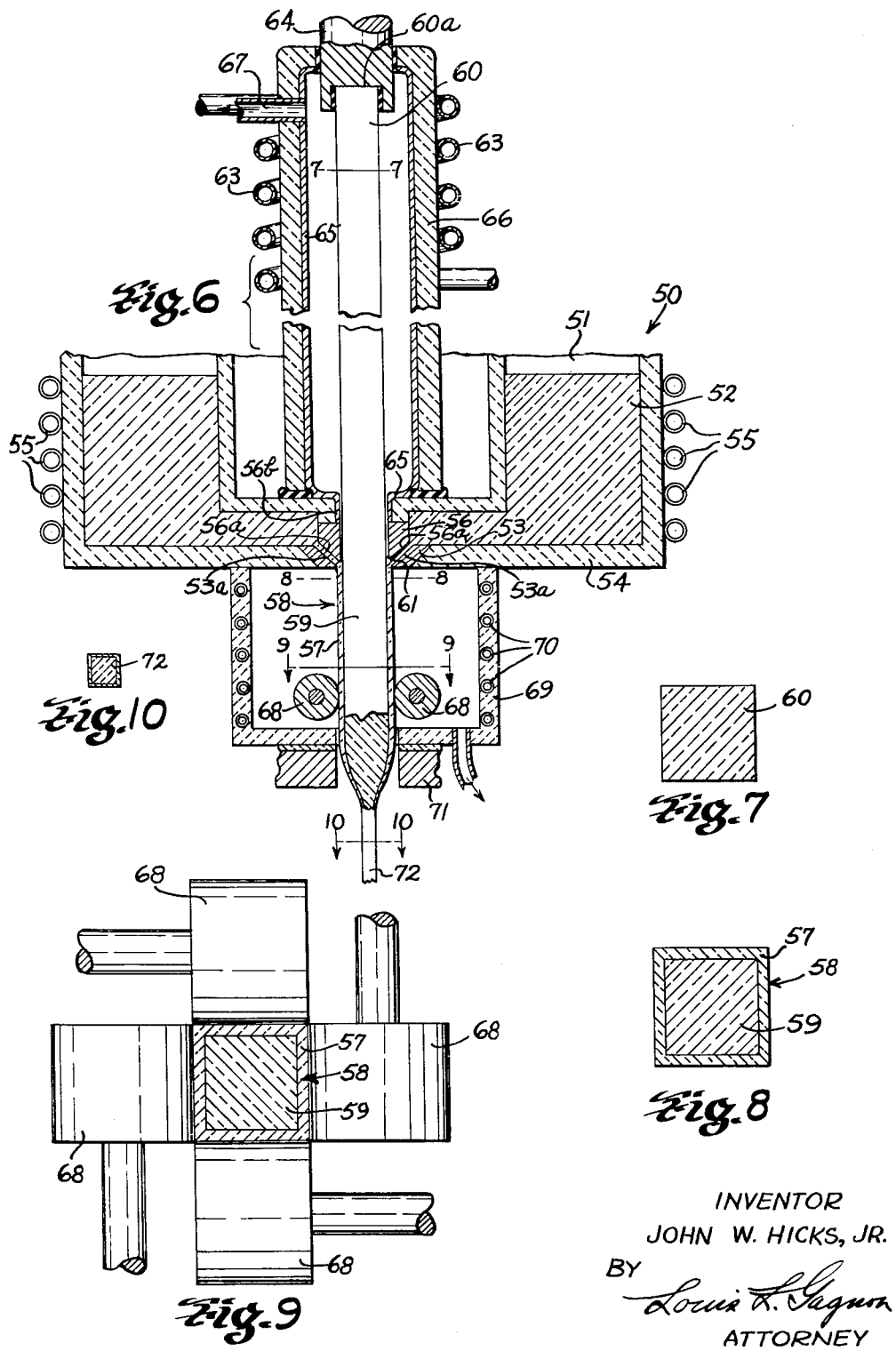

2,992,517
METHOD AND APPARATUS FOR USE IN THE FABRICATION OF LIGHT-CONDUCTING DEVICES
John W. Hicks, Jr., Fiskdale, Mass., assignor to American Optical Company, Southbridge, Mass., a voluntary association
Filed Aug. 11, 1958, Ser. No. 754,254
6 Claims. (Cl. 49—79)

This invention relates to the manufacture of light-conducting filaments or fibers and has particular reference to improved means and method for manufacturing fibers of the type having core parts of glass or other similar heat-softenable light-conducting material of a relatively high index of refraction and outer coatings or claddings of similar heat-softenable material having a relatively low index of refraction.

Various problems have been encountered heretofore in the manufacture of light-insulated or clad light-conducting fibers. One of these problems is that of economically producing a cladding on the core parts of the fibers which is of a desired substantially uniform thickness throughout the length of the fibers and which is perfectly fused or otherwise bonded to the core parts of the fibers without interfacial defects. Trapped air pockets, gas bubbles or foreign material such as dust or the like at the interface of the core and cladding parts of the fibers tend to disrupt or alter the normal paths along which light travels through the fibers thereby causing some of said light to be scattered or strayed into the claddings or outwardly of the fibers themselves. This reduces the efficiency of the fibers and renders them inferior.

It will become apparent that the present invention provides simple, efficient and economical means and method for overcoming the above-mentioned and other problems commonly encountered in the manufacture of fiberlike light-conducting devices and it is, accordingly, a principal object of this invention to provide novel means and method for forming individually light-insulated or clad light-conducting fibers.

Another object is to provide improved means and method for forming light conducting fibers of the above character on a continuous basis and of any desired length, size or cross-sectional configuration.

Another object is to provide means and method for forming coated or clad light-conducting fibers of the above character wherein the claddings and core parts of said fibers will simultaneously automatically become joined with each other during the process of the invention without exposure of the interfacial areas of said parts of the fibers to contaminants.

Another object is to provide novel means and method of cladding a rodlike structure of light-conducting material from which fibers of the above character are to be subsequently formed.

Another object is to provide improved apparatus and method for extruding from batch materials, light-conducting devices of the above character embodying parts differing in index of refraction which are joined together and each accurately proportioned in cross-sectional size and shape.

Another object is to provide novel means and method for forming devices of the above character wherein the joined parts thereof are substantially completely free of interfacial defects.

Another object is to provide simple, efficient and economical means and method for rapidly producing superior light-conducting fibers of the above-described insulated or clad type.

Other objects and advantages of the invention will become apparent from the following description when taken in conjunction with the accompanying drawings in which:

FIG. 1 is a diagrammatic longitudinal cross-sectional view of one form of apparatus used in carrying out the method of the invention and illustrates an article being formed in accordance with said method;

FIG. 2 is an enlarged transverse cross-sectional view taken on line 2—2 of FIG. 1;

FIG. 3 is an enlarged transverse cross-sectional view taken on line 3—3 of FIG. 1 looking in the direction of the arrows;

FIG. 4 is another enlarged transverse cross-sectional view taken on line 4—4 of FIG. 1 looking in the direction of the arrows;

FIG. 5 is an enlarged longitudinal cross-sectional view of one form of glass shaping means of the invention;

FIG. 6 is a diagrammatic longitudinal cross-sectional view of another form of apparatus used in carrying out the method of the invention and illustrates an article being formed in accordance with said method;

FIG. 7 is an enlarged transverse cross-sectional view taken on line 7—7 of FIG. 6;

FIG. 8 is also an enlarged transverse cross-sectional view taken on line 8—8 of FIG. 6;

FIG. 9 is another enlarged transverse cross-sectional view taken on line 9—9 of FIG. 6 looking in the direction of the arrows; and FIG. 10 is still another enlarged transverse cross-sectional view taken on line 10—10 of FIG. 6 looking in the direction of the arrows.

Referring more particularly to the drawings wherein like characters of reference designate like parts throughout the various views, there is diagrammatically illustrated means by which individually insulated or clad light-conducting fibers may be formed by simultaneously passing two differently characterized glasses or other similar heat-softenable materials through extruding means to form a basic composite integral structure of the two glasses which is thereafter accurately shaped to a desired cross-sectional configuration and drawn down to fiber size.

The term fiber as referred to herein is to be interpreted as including all light-conducting elements which are relatively long and small in cross-sectional dimension regardless of their cross-sectional configuration.

In FIG. 1 there is illustrated one form of apparatus for carrying out the method of this invention wherein there is provided a doubly-compartmented tank type furnace 20 having in each of its compartments 21 and 22 a supply of batch glass from which a light-insulated or clad fiber is to be fabricated. The tank furnace 20 may be of any desired outer contour but is preferably constructed to be cylindrical or circular in shape with the inner chamber 22 also being circular or cylindrical and disposed centrally therein so as to be surrounded by the annular outer chamber 21. Heating coils 23 are placed circumferentially about the chamber 21 to heat the glass therein to a predetermined controlled temperature which will be discussed in detail hereinafter and similar other heating coils 24 are placed circumferentially about the chamber 22 to controllably heat the glass therein in a manner also to be set forth in detail hereinafter.

An orifice 25 is provided through the underside of the base 26 of the tank furnace 20 through which the glass 27 within the chamber 21 is extruded or caused to flow outwardly of the tank furnace 20 and the bottom of the chamber 22 is necked down to form an orifice or restricted opening 28 through the bottom of the chamber 22. The axis of the opening 28 is aligned coincidentally with the axis of the orifice 25 and is of a size controlled according to the cross-sectional size desired of the core to be formed. Glass 29, in the chamber 22, when extruded through opening 28 will pass downwardly and outwardly of the tank furnace 20 through the orifice 25 simultaneously with the glass 27 from the chamber 21 so as to form the core and cladding parts of a composite glass structure from which light-conducting fibers of the character of this invention are subsequently drawn as will be discussed in detail hereinafter. The size of the orifice 25 is controlled in accordance with the size of the orifice 28 in order to produce the desired thickness of cladding on the core as predetermined in accordance with the controlled cross-sectional area of the core. While the opening 28 and orifice 25 may be of any desired shape, they will be described herein as being square for purposes of illustration.

Since, in general, it is desirable to construct light-conducting fibers of the above-described character with very thin outer claddings, such as for example 10% of the overall thickness of the fibers, it is desirable to initially form a rodlike glass structure 30 many times larger than the size desired of the fibers wherein the core 30a and cladding 30b parts of the rodlike structure 30 are proportionately controlled in size in accordance with that desired of the fiber to be formed therefrom. By so initially forming the sizeable structure 30, the outer cladding 30b thereof may be more readily controlled to be uniform in thickness and properly proportioned relative to the core 30a than would be the case if it were attempted to extrude an extremely small clad fiber directly from a tank furnace such as 20. By using larger orifices or exit openings in tank type furnaces, a more uniform and more easily controllable glass flow will result.

While it is within the scope of this invention to form relatively small clad structures directly from the tank furnace 20, the description will hereinafter be directed to the steps of initially forming the relatively and preferably large rodlike structure 30 and thereafter forming a fiber 31 from the structure 30 by a subsequent heating and drawing process to be later described.

In the construction of the tank furnace 20, the relative sizes of the two orifices 25 and 28 are controlled in accordance with the sizes or thickness desired of the core 30a and cladding 30b parts of the rodlike structure 30. That is, the orifice 25 (which for purposes of illustration will be considered to be square in shape) is of a cross-sectional size substantially equal to the overall cross-sectional size desired of the structure 30 and the orifice 28 (also square in cross-sectional shape) is of a cross-sectional size substantially equal to that desired of the core part 30a of the structure 30 whereby the thickness of the cladding 30b will automatically become substantially one-half of the difference between the widths of the orifices 25 and 28.

In order to provide means for causing the glass 29 to flow straight through the orifice 25 after leaving the exit end of the orifice 28, while maintaining its full outer dimensions and without becoming distorted when contacted by the flow of glass 27 from the chamber 21, the inner end of the orifice 25 is chamfered at 25a so as to receive the terminal end of the necked-down portion 22a of the chamber 22 which portion is beveled at 22b at an angle substantially equal to the angle of chamfer 25a. The portion 22a extends into the chamfered end of the orifice 25 a distance to provide a channel 34 between the surfaces 25a and 22b of a width substantially equal to one-half the difference between the widths of the orifices 25 and 28 which is the thickness desired of the cladding 30b to be formed on the structure 30. In this manner, the side walls of the necked-down portion 22a protect the flow of glass through the opening 28 from pressure which would otherwise be exerted against said flow of the glass 29 by the weight of the mass of glass 27 in the chamber 21. The restricted size of the channel 34, being substantially equal to the thickness of cladding 30b desired on the structure 30, allows only enough glass 27 to flow therethrough to form the cladding.

It can be seen that by forming both the core part 30a and cladding 30b of the structure 30 of glasses 29 and 27, respectively, which are caused to flow in the above manner, the interface between said core and cladding is completely free of contaminants since no air, dirt or dust can come between the core 30a and cladding 30b due to the fact that their assembly is made of virgin glass within the tank furnace 20 while the glasses 27 and 29 are in a molten state.

The orifices 25 and 28 are lined or may alternatively be formed entirely of a material such as platinum or the like which will resist attack by the glasses passing therethrough and thereby provide a smooth and clean interface between the cladding 30b and core 30a of the structure 30 as well as a smooth and uniformly dimensioned outer surface on the structure 30.

The glass 29 which forms the core 30a of the structure 30 is heated to a temperature such that it may be easily extruded through the orifice or opening 28 with a pressure of approximately 20 lbs./square inch if, for example, the orifice 28 is, approximately a ½" square opening. A flint glass having an index of refraction of 1.69 in the chamber 22 will require a temperature of approximately 1400° F. to render the glass 29 suitably viscous to flow properly with the 20 lb./square inch pressure. A suitable pressure on the glass 29 at the opening 28 may be provided by proper control of the volume or height of glass in the chamber 22. Alternatively, by applying air pressure against the surface of the glass 29, as indicated by arrows 32, a lower level of glass may be used since the air pressure will supplement the weight of the glass to provide the desired pressure at the opening 28, or a plunger may be forced against the upper surface of the glass 29 in place of the air pressure to provide the desired rate of extrusion. Since it is a matter of choice and immaterial to this invention as to what technique is used to provide the desired pressure on the glass for extrusion purposes, air pressure at 32 has been diagrammatically shown for purposes of illustration.

It should be understood that the pressures and temperatures required to properly extrude the glass will be variable in accordance with the particular melting points of the types of glasses used, it being only important that the glass 29 is not heated to a temperature which will cause it to draw under its own weight or become distorted by surface tension. If such conditions occur, they would be readily detectable and the temperature of the tank glass would be lowered accordingly.

The cladding glass 27 in the chamber 21 is heated to a temperature sufficient to cause it to flow freely around the core glass 29 and conform to the shape of the core 30b of the structure 30. This condition requires that the cladding glass 27 be of a viscosity of approximately one-fifth that of the core glass 29 and for a crown glass having an index of refraction of 1.52, which is the preferred glass to be used with the above-mentioned core glass, a temperature of approximately 1700° F. with a pressure of approximately 20 lbs./square inch at the orifice 25 will produce the desired results. Air pressure is illustrated at 33 to supplement the weight of the glass in the compartment 21 to provide the desired 20 lbs./square inch pressure at the orifice 25, it being understood that the glass level in the chamber 21 may be maintained sufficiently high to alone supply an adequate pressure at the orifice 25 or an annular ring-like plunger may be used to replace the air pressure at 33.

Immediately after contacting the core glass 29, the cladding glass 27 will fuse to the core glass and form an integral composite structure 30.

In order to protect the relatively large rodlike structure 30 from thermal shock when extruded from the tank furnace 20, a heating chamber 35 having heating coils 36 therein is provided beneath the orifices 25 and 28 of the tank furnace 20 and the temperature within the heating chamber 35 is maintained approximately 150° F. higher than the annealing point of the core 30a of the structure 30 (for the specific core glass given above by way of example, a temperature of approximately 1000° F. would be provided within the chamber 35).

It is pointed out that upon being extruded from the tank furnace 20, the structure 30 will assume an outer contour shape substantially that of the orifice 25. However, in order to be assured that the finally formed fiber 31 will be precisely of the desired cross-sectional shape, a set of forming rollers 37 are provided within the chamber 35 for receiving the structure 30 as it passes therethrough.

The forming rollers 37 (see FIGS. 1 and 3) in the particular case illustrated are provided to true up the cross-sectional square shape of the structure 30 and to simultaneously support the lower end of the structure 30 as it is passed through the chamber 35. Since slight variations in the overall shape and size of the structure 30 may occur due to slight variations in the temperatures of the glasses 27 and 29 within the tank furnace 20 or slight variations in the pressures used to extrude the glasses, it is desirable to provide truing means such as rollers 37 even in cases where the orifices 25 and 28 are initially contoured to the desired shape of the finally formed fiber 31. It is pointed out, however, that if it is so desired, the structure 30 may be reformed to a different shape than that of the orifice 25 and 28 by using rollers 37 of various different shapes in accordance with the cross-sectional shapes desired of the fiber 31. The structure 30 may be readily reformed to different shapes since the temperature within the chamber 35 is such as to render the glasses of the structure 30 readily reformable without destroying the proportionate sizes of the core and cladding parts 30a and 30b thereof.

The rollers 37 may be formed of graphite, steel with an outer coating of graphite or titanium carbide or other well-known materials suitable for glass reforming or shaping operations.

When using graphite rollers, caution must be taken to prevent the material of the rollers from burning off in the chamber 35 if the temperature within said chamber is raised above 1100° F. In the specific case given above wherein the temperature within the chamber 35 is maintained at approximately 1000° F. no material damage to the rollers 37 (if formed of graphite) would result. However, other combinations of glasses which might be used to form the structure 30 may have high annealing points thus requiring higher temperatures in the chamber 35 which would necessitate the provision of a neutral or substantially oxygen-free atmosphere in the chamber 35 to prevent a burning of the graphite rollers. In this case, nitrogen with possibly a trace of oxygen would be fed into the chamber 35 through a suitable pipeline 38. It should be understood that other well-known neutral or substantially oxygen-free atmosphere may be used to prevent a burning of the graphite rollers.

If the rollers 37 are constructed of titanium carbide which is more durable and longer lasting than graphite, caution must be taken to prevent such rollers from sticking to the glass of the structure 30. A simple solution to the problem of sticking is to provide means for maintaining the rollers 37 (when formed of titanium carbide) at a temperature substantially equal to the annealing temperature of the glasses of the structure 30. Since, as mentioned above, it is desirable to maintain a temperature in the chamber 35 which is approximately 150° F. higher than the annealing point of the glasses of the structure 30, the rollers 37 in this case must be continuously cooled to a temperature below the temperature of the chamber 35.

In FIG. 5 there is illustrated a roller 39 having its body part 40 of titanium carbide press fitted or otherwise secured to a shaft 41 which may be formed of a different material than that of the body part 40 if desired. A pair of longitudinally extending channels 42 and 43 are drilled or otherwise formed in the shaft 41 so as to open outwardly of the shaft 41 at its end opposite to the body part 40 and to terminate at a location adjacent the end of the shaft 41 which passes through the part 40. A lateral passageway 44 is drilled through a side of the shaft or otherwise formed as illustrated to connect the channels 42 and 43. If drilled as illustrated, the passageway 44 is preferably plugged at 45 so as to provide a U-shaped circulating system through which water or other coolants may be circulated as indicated by arrows 46 to dispel some of the heat produced in the part 40 by the heated atmosphere in the chamber 35 and the engaging glass of the structure 30. By properly controlling the rate of flow of the coolant through the shaft 41 the part 40 may be maintained at a relatively constant desired temperature.

It is pointed out that in cases where extremely high temperatures are required in the chamber 35, ducts or the like may be provided in the part 40 so as to interconnect with the channels 42 and 43 thereby permitting a flow of the coolant through both the shaft 41 and part 40 to provide a greater area of contact between the parts of the rollers 37 and the coolant. In this manner the glass contacting surfaces of the rollers may be more rapidly cooled.

Following the glass shaping operation wherein the structure is passed between the forming rollers 37, the structure is directed downwardly through an opening 47 in the base of the chamber 35 and through a heating ring 48 which is heated to a temperature such that the glasses of the structure 30 come to a suitable fiber drawing viscosity. For the glasses which were given hereinabove as illustrative of the invention, a temperature of approximately 1800° F. will render the structure 30 suitably viscous for fiber drawing.

The fiber 31 is drawn by gripping the lower end of the structure 30 at the heating ring 48 and pulling the same downwardly at a relatively rapid rate as compared to the rate of extrusion of the structure 30 from the furnace 20. It is pointed out that the cross-sectional size of the fiber 31 will be dependent upon the difference between the rate at which the structure is extruded and the rate at which the fiber is drawn. For a given rate of extrusion, the fiber size may be varied by increasing or decreasing the rate of drawing. Slower drawing rates will produce larger fibers and vice versa. Thus, it should be clear that any size fiber may be readily formed to any desired length provided a supply of the glasses 27 and 29 is always present in the furnace 20. It is also pointed out that by initially accurately forming the structure 30 to a particular desired cross-sectional shape and having properly proportioned core and cladding parts such as, for example, a cladding which is one-tenth as thick as the overall thickness of the structure 30, the resultant fiber 31, when drawn, will accurately assume the cross-sectional shape of the structure 30 and also accurately retain the proportionate thicknesses of its core and cladding parts. That is, regardless of the reduced size to which the fiber is drawn its cladding will always remain substantially one-tenth as thick as its overall dimension if the structure 30 was so initially formed.

With the apparatus and method set forth hereinabove, light-conducting fibers can be precision made rapidly, efficiently and economically. Furthermore, combinations of glasses which would ordinarily require annealing when in large sizes such as the structure 30 before being drawn into fibers by prior practices, may be directly drawn into fibers without annealing by following the teachings of this invention. However, if it is desired to produce relatively large structures such as 30 and to store the same for future use whereby fibers may be later drawn therefrom by the prior fiber drawing techniques, the structure 30 may be passed directly from the chamber 35 into an annealing furnace of conventional design rather than through the heating ring 48.

A modified form of the apparatus described hereinabove is shown in FIGS. 6 through 10 wherein a furnace 50 is illustrated in FIG. 6 as having a single compartment 51 in which is provided a supply of cladding glass 52 adapted to be extruded through an orifice 53 located substantially centrally at the bottom part 54 of the furnace 50 and heating coils 55 are placed circumferentially about the side of the compartment 51 to heat the glass 52 therein to a desired extruding temperature. Located centrally within the furnace 20 there is provided an orifice block 56 which extends downwardly part way into the orifice 53. The orifice 53 is chamfered at 53a to receive the lower end of the orifice block 56 which end is also chamfered at 56a to substantially the same degree as that of the chamfer 53a and spaced from the chamfer 53a a distance approximately equal to the thickness desired of the cladding 57 which is to be provided on the glass structure 58 to be formed with the apparatus of FIG. 6.

The orifice 53 is formed to the size and shape desired of the outer dimensions of the structure 58. The block 56 and orifice 53 are preferably lined with or formed entirely of a material such as platinum or the like which will resist attack by the glass 52 for the reasons given hereinabove with reference to the apparatus of FIG. 1.

The core part 59 of the structure 58 is formed by passing a solid rod 60 of core glass (such as, for example, a flint glass having an index of refraction of 1.69) downwardly through the orifice block 56 and through the orifice 53.

The rod 60 is of a cross-sectional size controlled in accordance with the size of the orifice 53 to provide a desired thickness of cladding 57 on the extruded structure 58. In effect, the rod 60 will act as a piston whereupon the rate of extrusion of the structure 58 from the furnace 50 can be controlled in accordance with the rate of descent thereof. As the rod 60 passes through the orifice 53 the cladding glass 52, passing through the channel 61 formed by the chamfered parts 53a and 56a, will engage the side walls of the rod 60 and become fused thereto. The temperature of the glass 52 is controlled so as to cause it to flow freely around the rod 60 and accurately conform to its shape and a temperature of approximately 1700° F. for a 1.52 index crown cladding glass will produce this result. Since the rod will heat rapidly as it approaches the orifice 53 and if overheated, it will distort so as to cause variations in the thicknesses of cladding 57 on the finally formed structure 58, it is necessary to provide means for maintaining the temperature of the rod 60 at approximately its annealing temperature until it passes through the orifice 53. For a rod 60 of flint glass having an index of refraction of 1.69, this temperature would be approximately 900° F. and a cooling system 63 through which a coolant such as water or the like may be circulated is provided to dissipate the excess heat which is conducted up through the rod during the extrusion operation.

It should be understood that other well-known forms of cooling means may be substituted for the coils 63. The cooling, speed of travel of the rod and the speed of extrusion is controlled so that the temperature of the rod at the location of contact of the extruded cladding glass therewith is at approximately 150° F. above the annealing point of the rod. This insures good fusion between the cladding and rod without distortion thereof.

In order to provide a smooth and clean interface between the cladding 57 and core parts 59 of the structure 58, the outer surface of the rod 60 is initially polished to a high degree of optical perfection and thoroughly cleaned. The rod 60 is then supported at its upper end 60a by a gripping member 64 which is accurately aligned relative to the orifice block 56 so as to align the lower part of the rod 60 centrally within the opening 56b therethrough. The opening 56b is slightly larger in size than the rod 60 so as to permit the rod 60 to pass therethrough without engaging the sides of said opening and a liner 65 of gold foil or other non-oxydizable material is fitted within the opening 56b and extended upwardly to surround the exposed surface of the rod 60 between its end 60a and the orifice block 56. The foil 65, being non-oxydizable as stated, protects the surface of the rod from becoming contaminated by any particulate matter or the like which might result from oxydization of the various parts of the apparatus. To further insure a perfect fusion between the cladding glass 52 and the rod 60, a vacuum chamber 66 is provided to enclose the rod 60. By evacuating the chamber through a suitable pipeline 67 the partial vacuum within the chamber 66 causes the cladding glass 52 to be drawn very slightly upwardly into the space 56b between the rod and orifice block 56 thereby causing the cladding glass 52 to form an intimate contact with the rod 60 to overcome any tendency for air pockets to form between the cladding glass 52 and the rod 60.

By providing a controlled pressure on the cladding glass in the chamber 52 in the manner discussed in detail hereinabove with regard to FIG. 1, and by lowering the rod 60 through the orifice 53 with conventional means, not shown, the rates of flow of the cladding glass and the lowering of the rod may be controlled to keep pace with each other and provide the structure 58 with a uniform accurately proportional cladding.

The cross-sectional shape of the orifice 53 and rod 60 are controlled in accordance with the shape desired of the structure and one-half the difference between the width of the orifice 53 and the rod 60 will determine the thickness of the cladding 57. The rod 60, orifice 53 and resultant structure 58 have been shown as being square in shape but it should be understood that any other desired shape of structure may be extruded from the furnace 50.

Following the forming of the structure 58, it is passed between a set of truing or reforming rollers 68 within a heating chamber 69 having heating coils 70 therein and thereafter heated to a viscosity suitable for fiber drawing by a heating ring or the like 71 whereupon the fiber 72 is drawn in the usual manner.

The apparatus for forming the fiber 72 including the rollers 68, heating chamber 69 and heating ring 71 is identical to the corresponding portion of the apparatus of FIG. 1 and the method of shaping and drawing the fiber 72 is also identical to that described above with regard to FIG. 1. Therefore, reference may be made to the description of FIG. 1 for more complete details regarding the technique of forming a fiber from the structure 58.

With the fiber drawing process of FIG. 2 the core glass, being in rod form may be examined for flaws or other defects before being used and, therefore, glasses of an exceptionally high degree of optical quality may be selected to form the core part of the fiber 72.

The fiber forming process involving the apparatus of FIG. 6 as well as that of FIG. 1 provides means for initially forming a relatively large clad glass structure and immediately drawing a fiber therefrom without annealing the large structure. Nevertheless, if it is desired to form structures such as 30 or 58 which are to be stored and later drawn into fibers, the heating ring 48 or 71 would be replaced by an annealing chamber through which the structure 30 or 58 would be passed and slow cooled after being shaped by the rollers 37 or 68.

From the foregoing, it will be seen that simple, efficient and economical means and method have been provided for accomplishing all the objects and advantages of the invention. Nevertheless, it should be apparent that many changes in the details of construction, arrangement of parts or steps in the method may be made by those skilled in the art without departing from the spirit of the invention as expressed in the accompanying claims and the invention is not to be limited to the exact matters shown and described as only the preferred matters have been given by way of illustration.

Having described my invention, I claim:

1. The method of making light-conducting means of pre-controlled cross-sectional shape embodying a core part of heat-softenable light-conducting material of a relatively high index of refraction having a comparatively thin outer cladding of heat-softenable material of a relatively low index of refraction thereon comprising continuously causing a substantially uniformly dimensioned rod-like mass of said high index material which is heated to a temperature below that which will enable it to draw under its own weight to move downwardly through a first orifice at a substantially constant rate and simultaneously extruding a low index material from a molten supply of said material through a second orifice into intimate circumferential contact with said heated rod-like mass of high index material while controlling the thickness of said low index material in accordance with the proportionate relative thickness desired of said outer cladding relative to said core part and on progressive circumferential areas of said rod-like mass which are confined within the walls of a portion of said second orifice and simultaneously protecting said areas from distortional pressure from said molten supply of said cladding material, and controlling the related temperatures of said high and low index materials to be such as to cause fusion to take place between said materials at said areas and to progressively form a composite integral structure of said materials.

2. The method of making a light-conducting means embodying a core part of heat-softenable light-conducting material having a comparatively thin outer cladding of heat-softenable coating material thereon comprising forming a continuous rod-like member of heat-softened light-conducting core material to a controlled contour shape and size from a molten supply of said material which is heated to a temperature below that which will enable it to be drawn under its own weight by forcing said molten core material under controlled pressure through a first extrusion orifice at a substantially constant rate and simultaneously continuously extruding a coating material from a molten supply of said material circumferentially about and in direct contact with said rod-like member through a second extrusion orifice circumventing said first orifice and controlled in size in accordance with the thickness desired of said outer cladding material and on progressive circumferential areas of said rod-like member which are confined within the walls of a portion of said second orifice and simultaneously protecting said areas from distortional pressure from said molten supply of said cladding material, and controlling the related temperatures of said core and coating materials to be such as to cause fusion to take place between said materials at said areas and to progressively form a composite integral structure of said materials.

3. The method of making light-conducting means embodying a core part of heat-softenable light-conducting material of a relatively high index of refraction having a comparatively thin outer cladding of coating material of a relatively low index of refraction thereon comprising continuously lowering at a controlled speed of movement, under a controlled temperature, an initially relatively rigid rod-like member formed of light-conducting material of a relatively high index of refraction endwise through a first orifice and through a second orifice surrounding said first orifice through which a molten coating material of a relatively low index of refraction is being flowed from a molten supply of said material and at a controlled rate while controlling the temperature to which said rod-like member and coating material are heated so that said rod-like member is retained below a temperature at which it will draw under its own weight and to cause said coating material to engage circumferentially about and to fuse with said rod-like member of high index of refraction throughout progressive areas initially confined within the walls of a portion of said second orifice while simultaneously protecting said areas from distortional pressure from said molten supply of said coating material and controlling the volume of said coating material permitted to circumvent said areas of said rod-like member in accordance with the relative cross-sectional thicknesses desired of said core part and outer cladding.

4. Apparatus for forming a light-conducting means having a core part of preselected cross-sectional size and shape and a relatively thin outer surrounding cladding material fused to said core part comprising a tank-type furnace having a pair of compartments a first one of which is adapted to hold a supply of heat-softenable light-conducting material and the other a supply of heat-softenable cladding material, means for heating said materials when in said compartments to pre-controlled temperatures adapted to render said materials flowable and fusible to each other with the temperature of the heating of said light-conducting material being so controlled that it will not draw under its own weight, said first one of said compartments having a tubular passageway therein terminating in a first exit orifice of a pre-selected shape and size through which heated light-conducting material in said compartment is permitted to flow, the other of said compartments having a second exit orifice axially aligned in adjacent surrounding relation with said first orifice and of a pre-selected larger diameter than said first orifice and contoured similar to said first orifice through which heated cladding material in said other compartment is permitted to flow, said tubular passageway having an end portion extending within the second passageway and said second passageway having a wall portion forming a closure area below said end portion, means for causing material from said first one of said compartments to flow through said first orifice and to pass substantially centrally through said second orifice at a pre-controlled rate, means for simultaneously causing material from said other of said compartments to flow through said orifice at a pre-controlled rate and progressively circumvent, join and fuse to initial progressive areas of said material flowing through the first orifice and lying within the confines of said closure area of said second orifice, said end portion of said first passageway being so constructed and correlated with the second passageway as to protect said material within the confines of the closure area against distortional pressure from said molten supply of said coating material.

5. Apparatus for forming a light-conducting means having a core part of heat-softenable light-conducting material and a comparatively thin outer cladding of a different heat-softenable material comprising a tank-type furnace having a central section embodying a tubular passageway terminating in an opening of pre-selected size and shape through which a relatively rigid rod-like member of light-conducting material having a similar cross-sectional size and shape to said opening may be passed endwise, holding means for supporting such a rod-like member in axial alignment with said opening, actuating means associated with said holding means adapted to move said holding means axially toward said opening to pass said rod-like member when supported thereby through said opening, a compartment extending around said central section for supporting a supply of heat-softenable cladding material, said compartment having an exit orifice therein axially aligned in adjacent relation with said opening and of similar shape but of larger size than said opening through which said cladding material may be continuously extruded into surrounding engaging relation with said rod-like member when the same is passed through said opening, means for heating and maintaining said cladding material in a flowable state while in said compartment, means for maintaining the material of said rod-like member at a temperature so controlled that it will not draw under its own weight but sufficient to bring about fusion of the materials of said cladding and rod-like member when said materials are joined to produce a composite fused structure thereof, said tubular passageway having an end portion extending within said exit orifice and said exit orifice having a wall portion producing a closure area below said end portion, and means for causing progressive areas of said heated rod-like member to pass through said opening and to simultaneously cause said heated cladding material to progressively circumvent, join and fuse to said progressive areas within said closure area of said exit orifice, said end portion of said tubular passageway being so constructed and correlated with said exit orifice as to protect said rod-like material within the confines of said closure area against distortional pressure from the molten supply of cladding material.

6. Apparatus for forming light-conducting means having a core part of heat-softenable light-conducting material and a comparatively thin outer cladding of heat-softenable material comprising a tank-type furnace having a central section embodying a tubular passageway having an exit opening of preselected size and shape through which material of the type desired of said core part may be progressively passed, a compartment extending around said central section for supporting a supply of molten cladding material, said compartment having an exit orifice therein axially aligned in adjacent relation with said opening and of a similar shape but of larger size than said opening through which said cladding material may be continuously extruded into surrounding engaging relation with said material of said core part, said tubular passageway having an end portion extending within the exit orifice and said exit orifice having a wall forming a closure area below said end portion, means for heating and maintaining said cladding material in a flowable state while in said compartment, means for maintaining said core material at a temperature sufficient to bring about fusion of said core and cladding materials upon contact with each other with the temperature of heating of said core material being so controlled that it will not draw under its own weight, and means for simultaneously moving said core material and said cladding material at predetermined controlled rates to cause progressive areas of said core material to be advanced through said opening and to cause said cladding material to progressively circumvent, join and fuse to said progressive areas of core material within the confines of said closure area, said tubular passageway and opening being so constructed and related with the exit orifice as to protect said core material within the confines of the closure area against distortional pressure from said molten cladding material.

References Cited in the file of this patent

UNITED STATES PATENTS

| | | |
|---|---|---|
| 1,565,307 | Blair | Dec. 15, 1925 |
| 1,663,628 | Ferngren | Mar. 27, 1928 |
| 2,313,296 | Lamesch | Mar. 9, 1943 |
| 2,502,312 | Danner | Mar. 28, 1950 |
| 2,780,889 | Fulk | Feb. 12, 1957 |
| 2,825,260 | O'Brien | Mar. 4, 1958 |

FOREIGN PATENTS

| | | |
|---|---|---|
| 849,842 | France | Aug. 28, 1939 |
| 496,838 | Italy | March 1956 |
| 520,564 | Italy | February 1957 |
| 239,719 | Sweden | Feb. 18, 1946 |

OTHER REFERENCES

Van Heel article, Nature, Jan. 2, 1954, page 39.